United States Patent
Zhang et al.

(10) Patent No.: US 11,956,648 B2
(45) Date of Patent: Apr. 9, 2024

(54) OPTIMIZE COMMISSIONING IN ZIGBEE NETWORK

(71) Applicant: SIGNIFY HOLDING B.V., Eindhoven (NL)

(72) Inventors: Zhi Zhong Zz Zhang, Shanghai (CN); Dun Fa Df Chen, Shanghai (CN); Hao Que, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 267 days.

(21) Appl. No.: 17/255,465

(22) PCT Filed: Jun. 18, 2019

(86) PCT No.: PCT/EP2019/066040
§ 371 (c)(1),
(2) Date: Dec. 23, 2020

(87) PCT Pub. No.: WO2020/002048
PCT Pub. Date: Jan. 2, 2020

(65) Prior Publication Data
US 2021/0274363 A1    Sep. 2, 2021

(30) Foreign Application Priority Data

Jun. 28, 2018   (WO) ................ PCT/CN2018/092850
Aug. 28, 2018   (EP) .................... 18191272

(51) Int. Cl.
*H04W 24/02*   (2009.01)
*H04W 4/80*    (2018.01)

(52) U.S. Cl.
CPC ............. *H04W 24/02* (2013.01); *H04W 4/80* (2018.02)

(58) Field of Classification Search
CPC ......... H04W 24/02; H04W 4/80; H04W 4/70; H04W 84/18; H04W 28/021; H04W 28/0883; H04W 84/20
See application file for complete search history.

(56) References Cited

U.S. PATENT DOCUMENTS 9,082,077 B2      7/2015  Petersen et al.
10,182,329 B1 *   1/2019  Roths .................... H04W 4/70
(Continued)

FOREIGN PATENT DOCUMENTS

EP         2887740 B1      9/2020
WO      2012044328 A1      4/2012
(Continued)

*Primary Examiner* — Ayaz R Sheikh
*Assistant Examiner* — David Zhijun Sun

(57) ABSTRACT

The present invention relates to commissioning in the presence of multiple networks. A network node, which is expected to join a second network, joins a first network and enters a second state from a first state once it has joined the first network. Once it has received from the first network a message to leave it, it enters a third state from the second state. The network node entered the third state becomes responsive with respect to the first network and/or the second network by receiving a dedicated message to join network or is unresponsive with respect to the first network. Then, it enters the first state from the third state once the network node has received the dedicated message from a coordinator of the first network after closing the first network and/or from a coordinator of the second network, or upon expiry of a timer.

15 Claims, 11 Drawing Sheets

(56) References Cited

U.S. PATENT DOCUMENTS

| | | | |
|---|---|---|---|
| 2004/0053622 A1 | 3/2004 | Nakakita et al. | |
| 2010/0150063 A1 | 6/2010 | Lee et al. | |
| 2016/0360596 A1* | 12/2016 | Thijssen | H05B 47/115 |
| 2017/0171950 A1 | 6/2017 | Barna et al. | |
| 2018/0035519 A1* | 2/2018 | Turvy, Jr. | H05B 47/11 |
| 2019/0020413 A1* | 1/2019 | Park | H04W 76/16 |
| 2019/0200245 A1* | 6/2019 | Khan | H04W 24/02 |
| 2020/0336929 A1* | 10/2020 | Zhou | H04W 76/18 |

FOREIGN PATENT DOCUMENTS

| | | |
|---|---|---|
| WO | 2015016655 A1 | 2/2015 |
| WO | 2015121781 A1 | 8/2015 |
| WO | 2017063884 A1 | 4/2017 |

\* cited by examiner

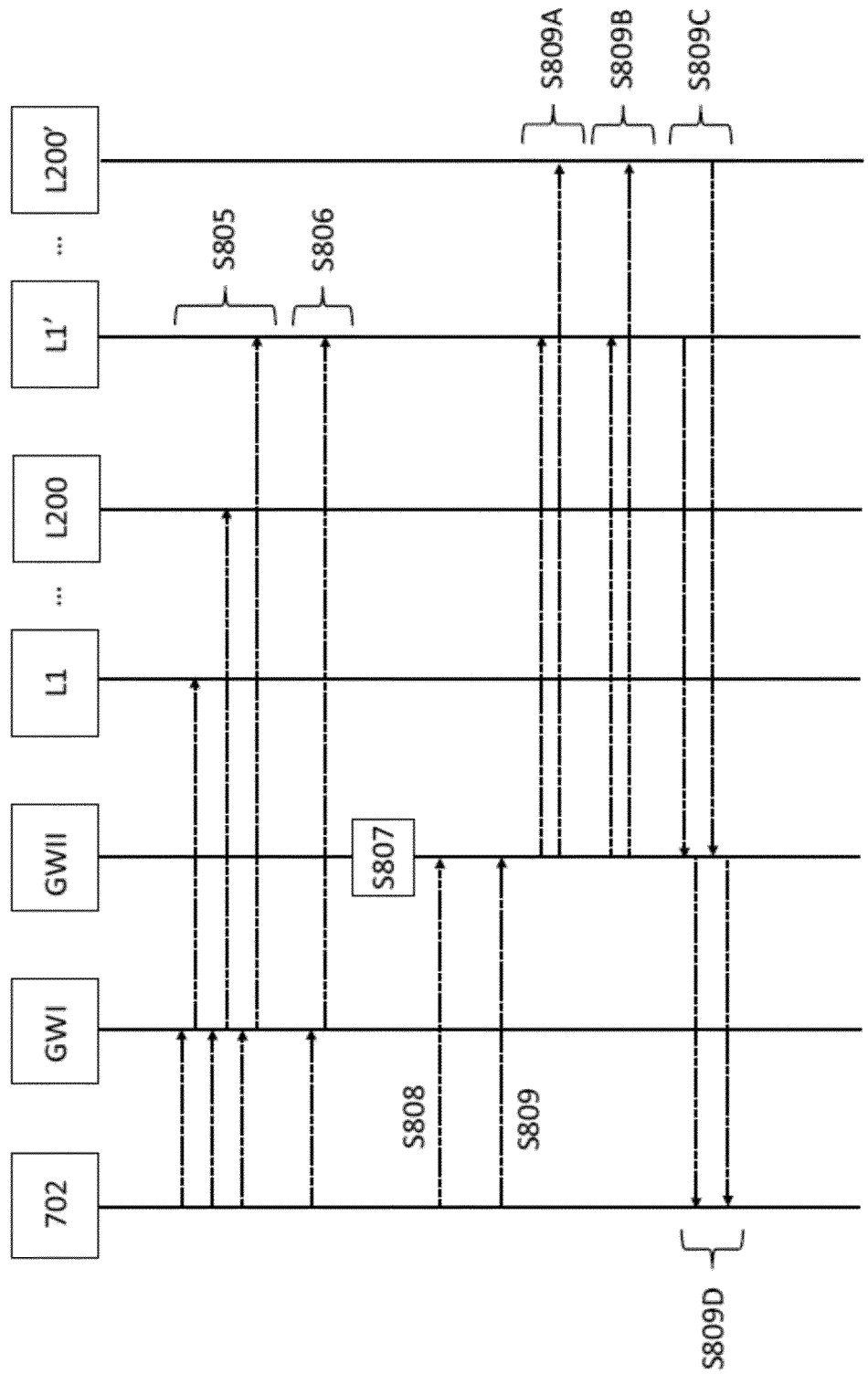

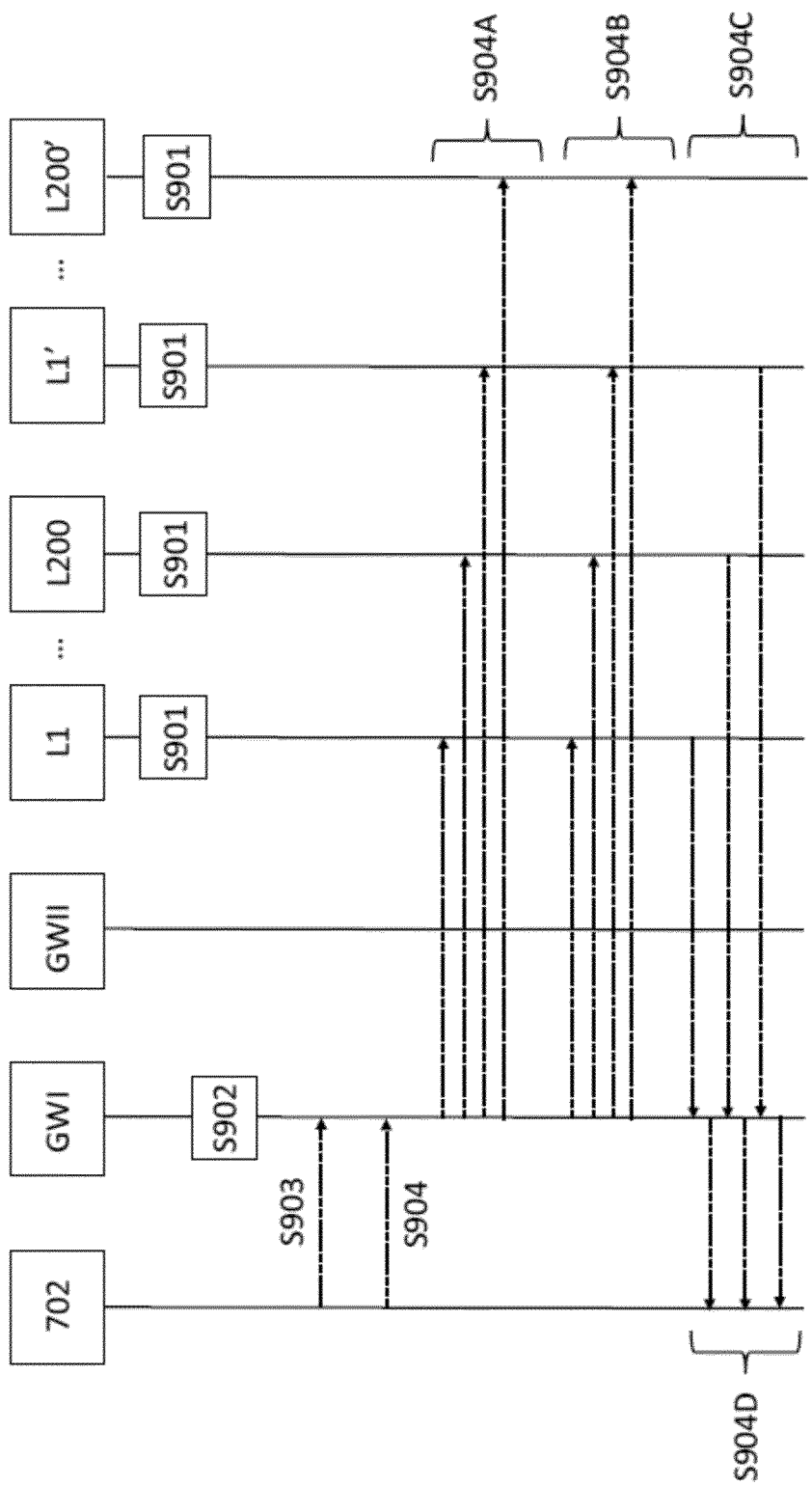

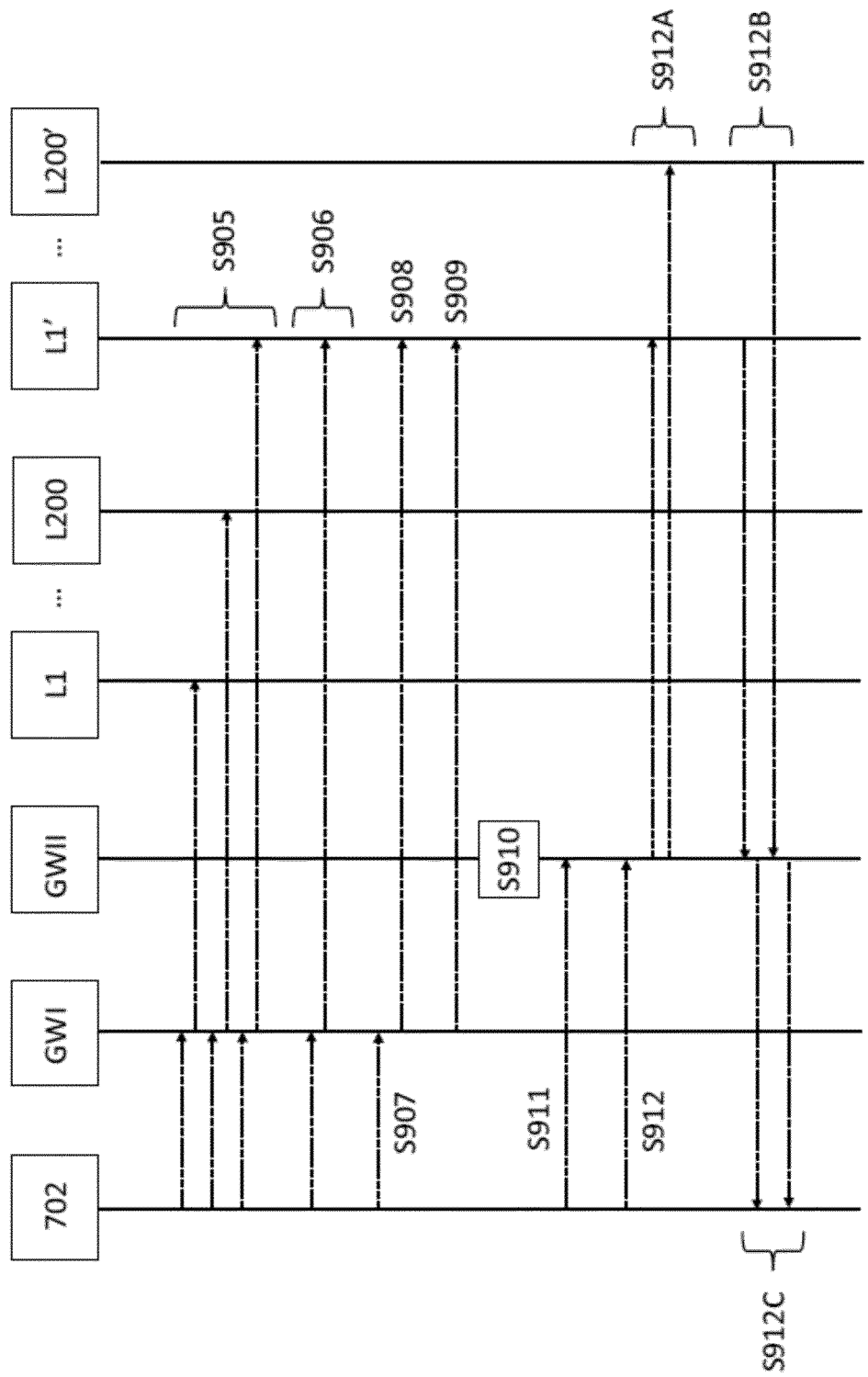

OPTIMIZE COMMISSIONING IN ZIGBEE NETWORK

CROSS-REFERENCE TO PRIOR APPLICATIONS

This application is the U.S. National Phase application under 35 U.S.C. § 371 of International Application No. PCT/EP2019/066040, filed on Jun. 18, 2019, which claims the benefit of Patent Application No. PCT/CN2018/092850, filed on Jun. 26, 2018 and European Patent Application No. 18191272.6, filed on Aug. 28, 2018. These applications are hereby incorporated by reference herein.

FIELD OF THE INVENTION

The invention relates to the field of commissioning of network devices in wireless networks, such as—but not limited to—ZigBee networks and in particular ZigBee lighting control networks.

BACKGROUND OF THE INVENTION

Wireless networks broadly deploy and, for example, wireless devices in a company or a family can form a personal area network (PAN), thereby allowing data to be transmitted within the company or the family via the PAN thus formed. Among the wireless network standards, ZigBee is a protocol for low-power, low-rate and low-cost communication in the Internet of Things (IoT), which is based on an IEEE 802.15.4 standard defining the operation of low-rate wireless PANs (WPANs) and allows to adequately and affordably control a wide range of devices in a mesh or tree-based topology. Each ZigBee network as a wireless mesh network or a WPAN can be either a centralized security network or a distributed security network, and application of such ZigBee networks may include, for example, home automation, office automation, building automation, retail services, smart energy, wireless sensing, wireless lighting control and so on.

FIG. 1 shows conventional PANs as centralized security networks 110A, 110B, in which three logical device types of node, such as coordinator (C), router (R) and end device (E) as specified according to the ZigBee protocol, are illustrated. Each node is made up of one or more devices and is designated, at any point in time, to only one of the logical types. Coordinators and routers are usually devices that are mains-powered, whereas end devices are usually battery-powered. The coordinator which includes a Trust Center (TC) is adapted to initialize and form its centralized security network and activate its Trust center functionality, provided that a single coordinator is respectively attributed to each centralized security network and shall not attempt to join another network.

To start a network, the coordinator (C) searches for a suitable radio frequency (RF) channel, which is available and without interference with the WLAN frequencies in use, and assigns a PAN identifier (PAN ID) to its network (i.e., its PAN) and a network address to itself. Once those parameters are determined and the network is initialized, the coordinator (C) and the routers (R) can allow other network nodes among the routers (R) and end devices (E) to join, through a so-called commissioning method of auto-join, the network thus formed as depicted in FIG. 1, and enter a commissioned (or joined-network) state (CS) from a factory-new (or factory-default) state (FNS) as depicted in FIG. 2 showing a conventional state diagram for a network node.

However, in such a case of a network environment with multiple networks, all nearby nodes, including even the nodes expected in other networks than the formed network, will be able to join the formed network and enter this commissioned state (CS) as depicted in FIG. 1. When these unexpected nodes are identified, they are required to leave the formed network before resetting to the factory-new state (FNS) as depicted in FIG. 2. However, after entering the factory-new state (FNS) from the commissioned state (CS), they can again join the formed network through a next trigger of the so-called commissioning method of auto-join.

SUMMARY OF THE INVENTION

It is an object of the present invention to achieve a reliable commissioning in the presence of multiple networks by avoiding that a network node being required to leave a network joins it again.

According to a first aspect directed to joining a second network being a PAN with a coordinator, the network node may be adapted to enter a second state from a first state once the network node has joined a first network being a PAN with a coordinator, the first network being other than the second network, and adapted to enter a third state from the second state once the network node has left the first network, e.g., received from the first network a message to leave the first network, the network node entered the third state, the third state being different from the first and the second states, the network node enters the first state from the third state upon a predetermined trigger condition is met.

In an example, the first and second networks may be ZigBee networks. Once entered the third state, the network node may become unresponsive with respect to the first network in terms, for example, of message, command, frame, request or the like received by itself from the first network and other than the dedicated message. Thanks to the additional third state, the network node having left an undesired network as the first network can be avoided to join it again, for example, during a commissioning procedure of auto-join allowing the network node to join its desired network as the second network.

In an example of the first aspect, the network node may be adapted to start a timer once the network node has left the first network, e.g. after receiving a message to leave the first network, the timer having a predetermined time duration, and adapted to enter the first state from the third state once the predetermined time duration of the timer has expired. Thereby, the network node can use an appropriate countdown of the timer to remain in the third state, the countdown allowing the second network to have time enough to form and open and allowing the network node to join the second network as formed.

In an example of the first aspect, the network node may be adapted to enter the first state from the third state once the network node has received a message instructing the network node to enter the first state (refer it as a dedicated message hereinafter) from the first network or from the second network. Thereby, only the network node entered in the third state can be responsive to the dedicated message, which may be sent by the first network or the second network.

In an example of the first aspect, the network node may be adapted to enter the second state from the first state once the network node has joined the second network. Thereby, the commissioning procedure of auto-join can be achieved starting from the first state.

In an example of the first aspect, the network node leaving a network can be initiated by the network coordinator or by the network node itself. E.g., a message to leave the first network may be received from a coordinator node of the first network, or the network node sends a leave network request to the coordinator. At each mesh network is associated a single coordinator node, which may be a gateway, a ZigBee coordinator or a ZigBee transceiver.

In an example of the first aspect, the dedicated message from the first network may be received from a coordinator node of the first network after closing the first network, and the dedicated message from the second network may be received from a coordinator of the second network. At each mesh network as the first and second networks is associated a single coordinator node, which may be a gateway, a ZigBee coordinator or a ZigBee transceiver.

In an example of the first aspect, the dedicated message may be a new message or an enhanced existing message. For example, the new message may be a new proprietary message and the enhanced existing message may be an enhanced beacon message, in which the protocol ID of network (NWK) layer information may be set to a value "1" instead of "0" for a "normal" protocol ID as it is disclosed in the ZigBee specification about the NWK layer information field in the beacon payload.

In an example of the first aspect, the enhanced existing message may be an enhanced permit-join request having a predetermined time duration (e.g., three seconds) and a predetermined structure (e.g., in the form of three continuous normal permit-join requests having each a time duration of one second).

In an example of the first aspect, the first state may be a factory-new state, the second state may be a commissioned (or joined-network) state and the third state may be a not-commissioned or pre-factory-new state. Thereby, the third state can be an additional state with respect to the factory-new and commissioned states specified in the Zig-Bee standard, e.g. like a state of idle. The third state is different from the first state and the second state and in which the network node won't start commission procedure of auto-join as in first state. The network node in third state are only responsive to predetermined trigger conditions to enter first state.

In another example of the first aspect, the network node enters the first state from the third state upon a reboot of the network node, e.g. a manually reboot.

According to a second aspect, a lighting system may comprise a plurality of network nodes as claimed in the first aspect and/or in any of the examples of the first aspect. Thereby, the lighting control can be optimized.

According to a third aspect directed to joining a second network for a network node, a method may comprise entering a second state from a first state once the network node has joined a first network, the first network being other than the second network, and entering a third state from the second state once the network node has received from the first network a message to leave the first network, the network node entered the third state being responsive with respect to the first network and/or the second network by receiving a dedicated message to join network or being unresponsive with respect to the first network.

In an example of the third aspect, the method may comprise starting a timer once the network node has received the message to leave the first network, the timer having a predetermined time duration, and entering the first state from the third state once the predetermined time duration of the timer has expired.

In an example of the third aspect, the method may comprise entering the first state from the third state once the network node has received the dedicated message from the first network and/or from the second network.

In an example of the third aspect, the method may comprise entering the second state from the first state once the network node has joined the second network.

According to a fourth aspect directed to a computing device, a computer program product may comprise program instructions or code means such that, when the computer program product is run on a processing unit of the computing device, the computing device is arranged to perform the method as claimed in the third aspect and/or in any of the examples of the third aspect.

It is noted that the above apparatuses may be implemented based on discrete hardware circuitries with discrete hardware components, integrated chips, or arrangements of chip modules, or based on signal processing devices or chips controlled by software routines or programs stored in memories, written on a computer readable media, or downloaded from a network, such as the Internet.

It shall be understood that a preferred embodiment of the invention can also be any combination of the dependent claims or above embodiments with the respective independent claim.

These and other aspects of the invention will be apparent from and elucidated with reference to the embodiments described hereinafter.

BRIEF DESCRIPTION OF THE DRAWINGS

For a better understanding of the present application, reference will now be made by way of examples to the accompanying drawings in which:

FIGS. 8A and 8B show a signaling diagram illustrating a complete procedure for a luminaire device to leave a network created by a gateway and join another network created by another gateway, according to an embodiment of the present invention; and FIGS. 9A and 9B show an alternative signaling diagram illustrating a complete procedure for a luminaire device to leave a network created by a gateway and join another network created by another gateway, according to an embodiment of the present invention.

DETAILED DESCRIPTION OF EMBODIMENTS

Embodiments of the present invention will be described based on a ZigBee network conforming to the ZigBee standard, as an example of a wireless mesh network. However, the present invention is not limited thereto, and the method provided by the present invention may be applied to any wireless mesh network and be based on different wireless network standards.

Figure 1:
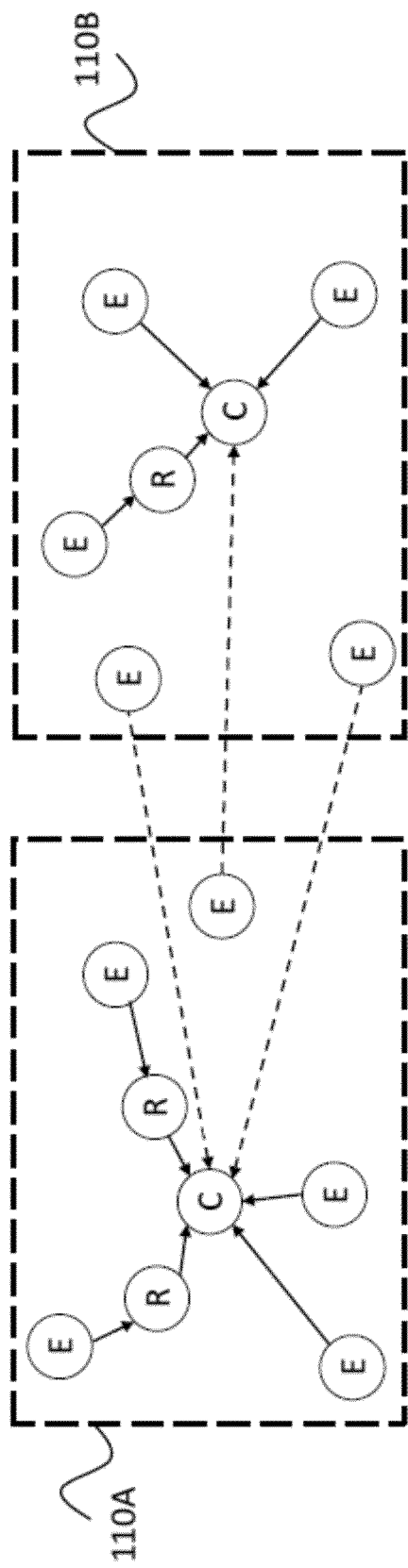
FIG. 1 shows personal area networks as centralized security networks, according to a conventional embodiment.
Figure 2:
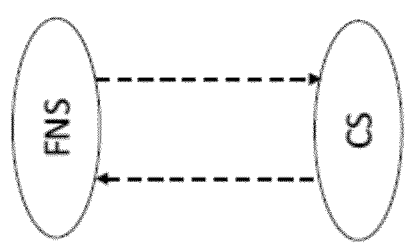
FIG. 2 shows a schematic state diagram indicating two state transitions of a network node, according to a conventional embodiment.

Referring to the above-mentioned FIG. 2, there are typically two states, namely a first state designated as factory-new (or factory-default) state (FNS), and a second state designated as commissioned (or joined-network) state (CS), in which a network node (i.e., an end device or a router) will operate in the ZigBee network. When a network node configured to belong to a given ZigBee network (designated hereafter as second network) is manually or automatically identified in another ZigBee network (designated hereafter as first network) as illustrated in FIG. 1, it is required to leave it by receiving a "Leave_Req" command from the coordinator (C) of the first network and then reboot or reset to enter the FNS state from the CS state with, however, the risk of connecting again to the first network during the next commissioning step of auto-join.

Figure 3:
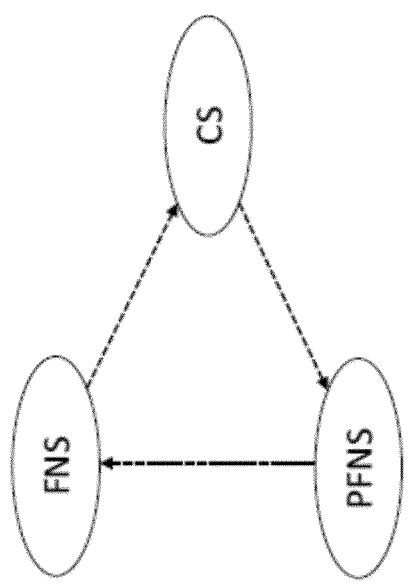
FIG. 3 shows a schematic state diagram indicating three state transitions of a network node, according to an embodiment of the present invention.

FIG. 3 shows a schematic state diagram indicating three state transitions of a network node, according to a first embodiment of the present invention.

Referring to FIG. 3, the network node may, in addition to the FNS and CS states, be adapted to enter a third state designated as pre-factory-new state (PFNS) and corresponding to a not-commissioned state. The unexpected network node, i.e., the network node connected to the undesired network, will enter the PFNS state from the CS state by receiving the "Leave-Req" command from the coordinator (C) in order to leave the first network. Then, the unexpected network node will reboot or reset to enter the FNS state from the PFNS state, after receiving a dedicated message to join the second network (for example, from the second network, i.e., the ZigBee network that it actually desires to join, or for example, from the first network, i.e., the ZigBee network that it was required to leave), and/or after expiry of a timer having a predetermined time duration. Once entered the PFNS state, the network node becomes unresponsive with respect to the first network in terms, for example, of message, command, frame, request or the like other than the dedicated message. Afterwards, the unexpected network node will join the second network through the commissioning step of auto-join by changing its state from FNS to CS (i.e., by entering the CS state from the FNS state). Thereby, an unexpected network node in a network will be avoided to reboot or reset just after leaving the network and automatically join again the same network according to the commissioning step of auto-join. Hereafter, the procedure for a network node leaving a network and joining another network will be described in detail with reference to accompanying drawings.

Figure 4:
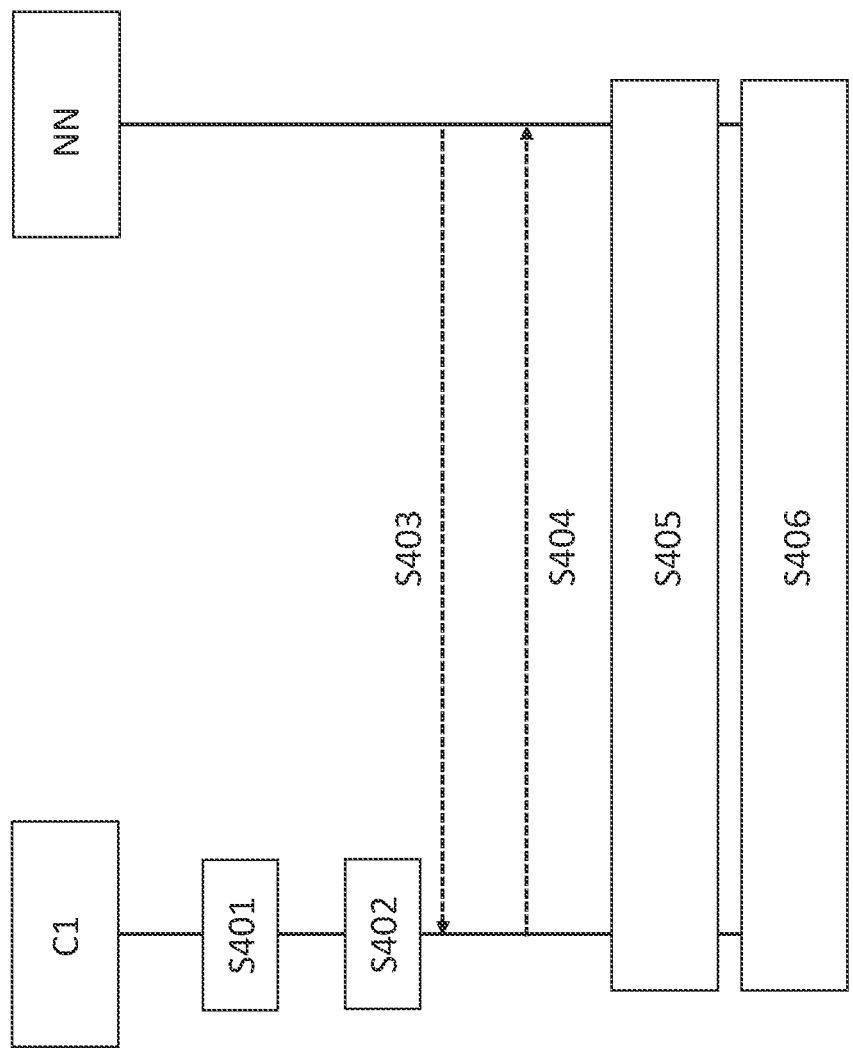
FIG. 4 shows a signaling diagram illustrating the step of commissioning the network node to join the first network, according to an embodiment of the present invention.

FIG. 4 shows a signaling diagram illustrating the step of commissioning the network node NN to join the first network, according to an embodiment of the present invention.

Referring to FIG. 4, at step S401, the coordinator C1 of the first network initializes and forms its network before opening it at step S402. At step S403, the network node NN scans its environment in order to find an open network. Once the established first network has been found, the network node sends, at step S404, a beacon request message to the coordinator C1 of the first network in order to know whether this coordinator C1 is in a permit-to-join (or allow-to-join) state, and receives in response, at step S405, a beacon message from the coordinator C1 in the permit-to-join (or allow-to-join) state. At step S406, the network node NN automatically starts a join procedure by sending a join request message to the coordinator C1 of the first network, which in turn sends a join response message to the network node NN. Upon receipt of the join response message, the network node NN successfully joins the first network by connecting to the coordinator C1 of the first network, and changes its state from FNS to CS.

Figure 5:
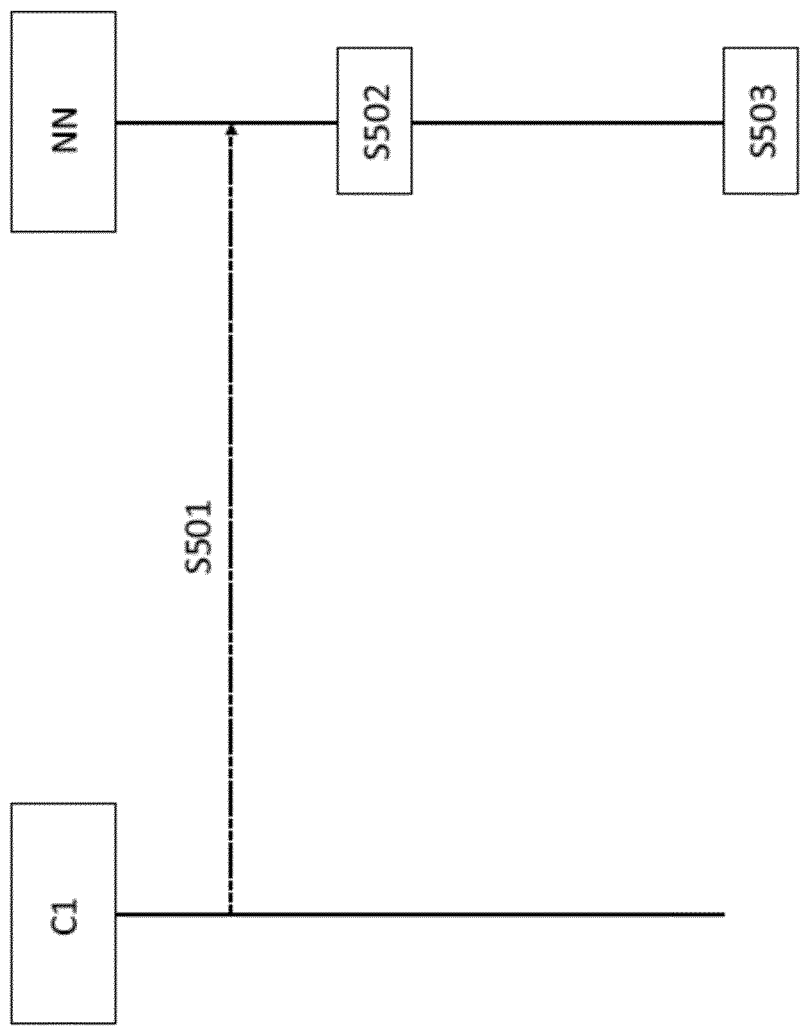
FIG. 5 is a signaling diagram illustrating the step for a network node to leave the first network, according to an embodiment of the present invention.

FIG. 5 shows a signaling diagram illustrating the step for a network node NN to leave the first network, according to an embodiment of the present invention.

Referring to FIG. 5, at step S501, the coordinator C1 of the first network sends the "Leave-Req" command to the unexpected network node NN. The coordinator C1 of the first network may have found the unexpected network node NN either manually, for example, by requesting each node of its first network to blink or automatically, for example, by means of an application running on a mobile user terminal such as a mobile phone, smartphone, tablet, laptop or the like. Upon receipt of the "Leave-Req" command, the network node NN starts, at step S502, a timer having a predetermined time duration, and changes, at step S503, its state from CS to PFNS. By working in the PFNS state once the network node NN has left the first network, the network node NN will be unresponsive with respect to the first network, i.e., the network that it was required to leave, in terms, for example, of message, command, frame, request or the like transmitted by the first network to the network node NN. During the predetermined time duration of the timer, the network node NN will not reboot or reset to the FNS state from the PFNS state in order to allow the second network to have time enough to form and open and the network node NN to join the second network as formed. Upon expiry of the timer, the network node NN will enter the FNS state from the PFNS state.

Figure 6:
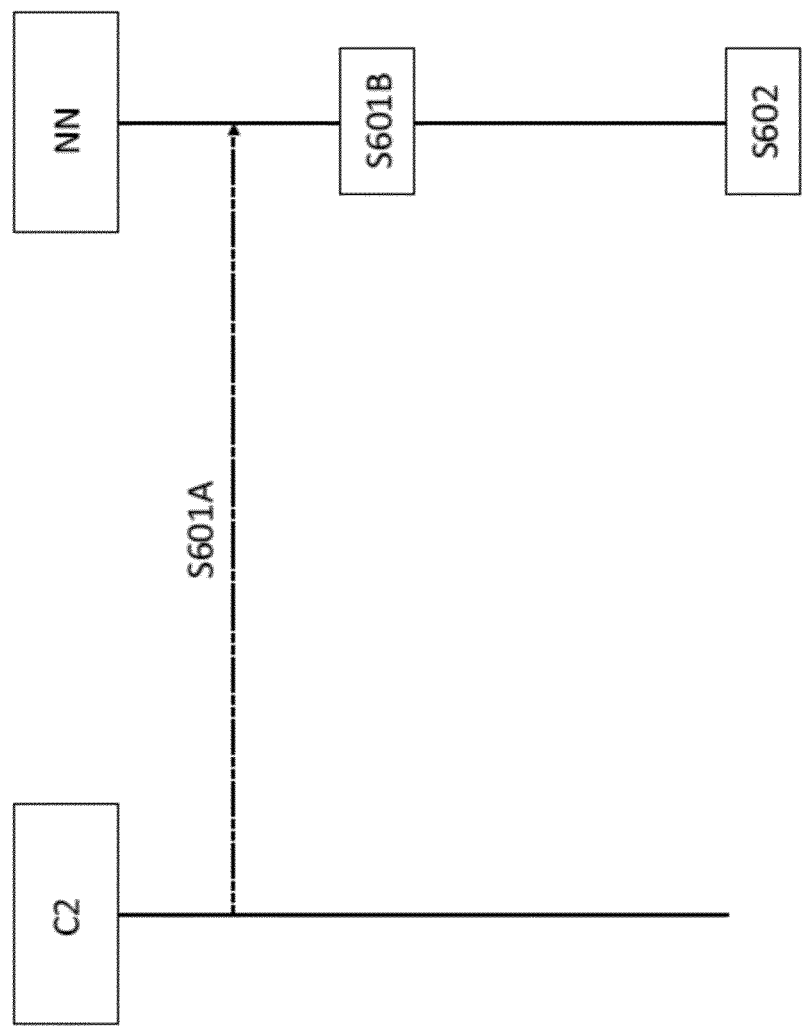
FIG. 6 is a signaling diagram illustrating the step for a network node to join the second network, according to an embodiment of the present invention.

FIG. 6 shows a signaling diagram illustrating the step for a network node NN to join the second network, according to an embodiment of the present invention.

Referring to FIG. 6, at step S601A corresponding to an exemplary embodiment, the coordinator C2 of the second network sends a dedicated message to join the second network, which may be a new message or an enhanced existing message (e.g., an enhanced beacon message, in which the protocol ID of network (NWK) layer information may be set to a value "1" instead of "0" for a "normal" protocol ID as it is disclosed in the ZigBee specification about the NWK layer information field in the beacon payload), and which can only be responded by a network node entered the not-commissioned state (i.e., the PFNS state) after leaving another network. Here, the network node NN entered the PFNS state after leaving the first network receives the dedicated message from the coordinator C2 of the second network, which is other than the first network, and then reboots or resets, at step S602, to enter the FNS state from the PFNS state. At step S601B corresponding to an alternative exemplary embodiment, the network node NN entered the PFNS state after leaving the first network will reboot or reset, at step S602, to enter the FNS state from the PFNS state upon expiry of the predetermined time duration of the timer, which was triggered by the network node NN upon receipt of the "Leave-Req" command from the coordinator C1 of the first network. Finally, the network node NN entered the FNS state will join, through a next commissioning step of auto-join, the second network as expected and will enter the CS state. It should be noted that the dedicated message to join the second network may, in an alternative exemplary embodiment, be sent by the coordinator C1 of the first network to the network node NN that is in the PFNS state after leaving the first network.

In another exemplary embodiment, the timer and the dedicated message may be used together. In an example case that the network node NN has rebooted or reset to the FNS state upon receipt of the dedicated message and then enters the CS state before expiry of the predetermined time duration of the timer, the network node NN, which is already in the CS state when the timer has expired, remains in the CS state. That is to say, the node NN will enter FNS state if it's in PFNS state when the timer expires. The node NN will remain in the state which is not PFNS if it's in a state which is not PFNS state when the timer expires.

Figure 7:
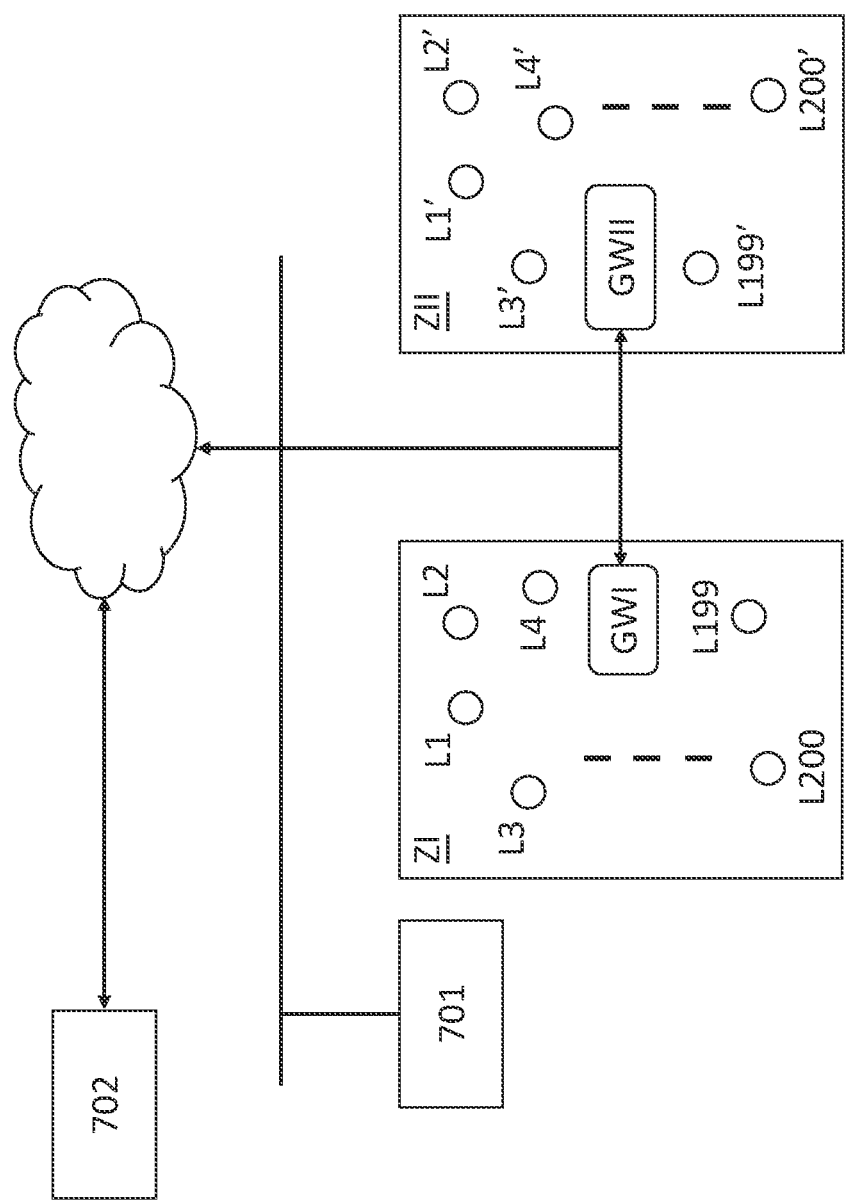
FIG. 7 shows a schematic architecture of a lighting system, according to an embodiment of the present invention.

As an exemplary implementation of the present invention, FIG. 7 shows a schematic architecture of a lighting system 700 within an open office, according to an embodiment of the present invention.

Referring to FIG. 7, the lighting system 700 comprises two zones ZI, ZII and one power switch 701. Each zone ZI, ZII comprises one or more luminaire devices as ZigBee nodes, which are numbered from L1 to L200 for the zone I and from L1' to L200' for the zone II and are adapted to emit illumination. Each luminaire device L1-L200, L1'-L200' may comprise at least one respective lamp such as a light emitting diode (LED) based lamp, gas-discharge lamp or filament bulb, plus any associated support, casing or other such housing. Each luminaire devices L1-L200, L1'-L200' may also take any suitable form such as a ceiling or wall mounted luminaire, a free-standing luminaire, a wall washer and a chandelier, or a less conventional form such as an embedded lighting built into an item of furniture, a building material (e.g., glass, concrete) and any other surface. The single power switch 701 is adapted to physically turn on and turn off the entirety of these luminaire devices L1-L200, L1'-L200' at once. Each zone ZI, ZII respectively comprises one gateway GWI, GWII, which may be employed as a ZigBee coordinator or a ZigBee transceiver to communicate with the luminaire devices L1-L200, L1'-L200'. Furthermore, each gateway GWI, GWII may be controlled by a manufacturer- or third-party application such as a mobile app running on a mobile user terminal 702 such as a mobile phone, smartphone, tablet, laptop or the like. The mobile user terminal 702 may communicate with the gateways GWI and GWII via a local short-range radio access technology (e.g., Wi-Fi, Bluetooth, ZigBee and so on), and use the mobile app to send commands via the Internet to each gateway GWI, GWII, which translates the commands into ZigBee command frames and transmits them to the luminaire devices L1-L200, L1'-L200'. In a commissioning procedure of auto-join running on the mobile user terminal 702, the luminaire devices L1-L200 are expected to connect to the gateway GWI in the zone ZI, while the luminaire devices L1'-L200' are expected to connect to the gateway GWII in the zone ZII. However, in an exemplary embodiment, the luminaire device L1' unexpectedly joins the network created by the gateway GWI.

In connection with FIGS. 3, 4, 5 and 6, FIGS. 8A and 8B show a signaling diagram illustrating the complete procedure for the luminaire device L1' (i.e., the luminaire device being unexpectedly connected to the gateway GWI) to leave the network created by the gateway GWI and join the network created by the gateway GWII, according to an embodiment of the present invention. In this embodiment, an enhanced permit-join request (e.g., a dedicated message to join the second network) is sent by the gateway GWII (e.g., the coordinator C2) to the luminaire device L1' (e.g., the network node NN) once entered the PFNS state.

Figure 8A:
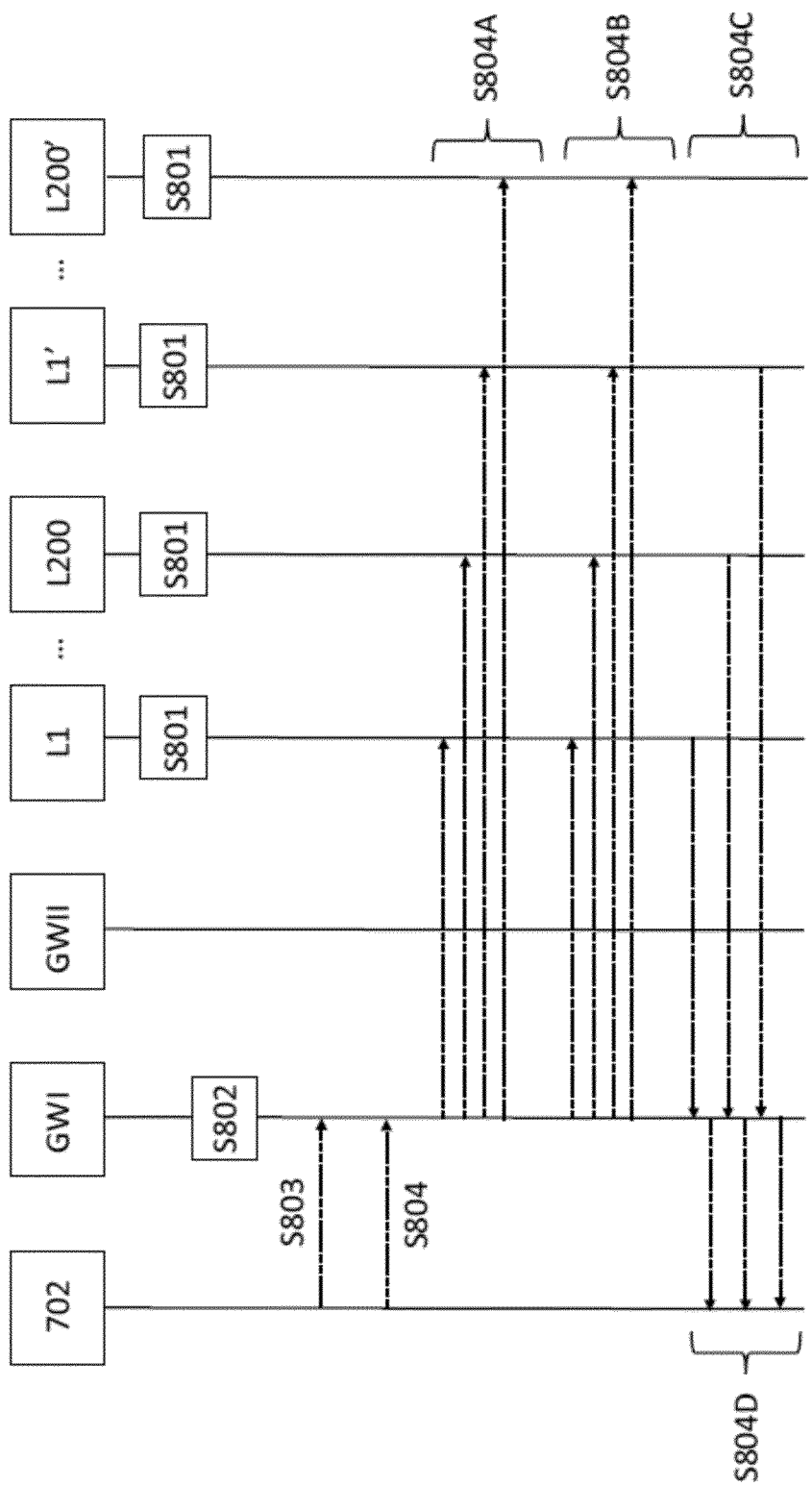

Referring to FIG. 8A, at step S801, all luminaire devices L1-L200, L1'-L200' are turned on at once by means of the power switch 701 and all of them enter the FNS state. At step S802, the gateway GWI is individually turned on, while the gateway GWII remains turned off. At step S803, the gateway GWI connects to the mobile app via the mobile user terminal 702 and, at step S804, the mobile app triggers the gateway GWI to form its own network (e.g. the first network). To do so, the gateway GWI starts a luminaire device discovery during a predetermined time duration (e.g., 30 minutes) by sending to all luminaire devices L1-L200, L1'-L200' a respective enhanced permit-join request, as a dedicated message to join its own network (i.e., the first network), during a limited time duration (e.g., 1 minute) at step S804A, and then, a respective normal permit-join request, as a respective normal message to join its own network (i.e., the first network), during the remaining time duration (i.e., 29 minutes) at step S80413. Only the luminaire devices entered the PFNS state (i.e., the not-commissioned state) will be responsive to the enhanced permit-join request by changing their state from PFNS to FNS. However, at this stage, all luminaire devices L1-L200, L1'-L200' are assumed to be in the FNS state. In response to receiving the normal permit-join requests, the expected luminaire devices L1-L200 and the unexpected luminaire device L1' connect, at step S804C, to the gateway GWI in the zone ZI and enter the CS state from the FNS state. Then, the gateway GWI reports, at step S804D, the list of the connected luminaire devices L1-L200, L1' to the mobile user terminal 702.

Referring to FIG. 8B, the mobile user terminal 702 instructs, at step S805, the powered-on gateway GWI to identify the possible unexpected luminaire devices by making all connected luminaire devices L1-L200, L1' blink one by one. After finding the unexpected luminaire device L1', the mobile user terminal 702 instructs, at step S806, the powered-on gateway GWI to remove this unexpected luminaire device L1'. Once it has been removed upon receipt of a "Leave-Req" command, the unexpected luminaire device L1' changes its state from CS to PFNS. If needed, the steps S805 to S806 may be performed again to ensure that all unexpected luminaire devices are well identified. In turn, the gateway GWII is, at step S807, turned on. At step S808, the gateway GWII connects to the mobile app via the mobile user terminal 702 and, at step S809, the mobile app triggers the gateway GWII to form its own network (e.g., the second network). To do so, the gateway GWII starts a luminaire device discovery during a predetermined time duration (e.g., 30 minutes) by sending to the non-connected luminaire devices L1'-L200' a respective enhanced permit-join request, as a dedicated message to join its own network (i.e., the second network) during a limited time duration (e.g., 1 minute) at step S809A, and a respective normal permit-join request, as a normal message to join its own network (i.e., the second network), during the remaining time duration (i.e., 29 minutes) at step S809B. At this stage, only the luminaire device L1' entered the PFNS state (i.e., the not-commissioned state) will be responsive to the enhanced permit-join request by rebooting or resetting to the FNS state, i.e., by changing its state from PFNS to FNS, whereas the luminaire devices in the FNS state will be responsive to the normal permit-join requests. Thereby, the luminaire devices L1' and L2'-L200' are all in the FNS state at this stage. In response to receiving the normal permit-join requests, the expected luminaire devices L1'-L200', which are all in the FNS state, connect, at step S809C, to the gateway GWII in the zone ZII and enter the CS state from the FNS state. Then, the gateway GWII reports, at step S809D, the list of the connected luminaire devices L1'-L200' to the mobile user terminal 702. Thus, the above complete procedure of FIGS. 8A and 8B has enabled the luminaire device L1', which was unexpectedly connected to a "wrong" network formed by the gateway GWI, to expectedly connect to a "right" network formed by the gateway GWII, while preventing it from connecting again to the gateway GWI.

FIGS. 9A and 9B show an alternative signaling diagram illustrating the complete procedure for the luminaire device L'1 (i.e., the luminaire device being unexpectedly connected to the gateway GWI) to leave the network created by the gateway GWI and join the network created by the gateway GWII, according to an embodiment of the present invention. In this embodiment, an enhanced permit-join request (e.g., a dedicated message to join the second network) is sent by the gateway GWI (e.g., the coordinator C1) to the luminaire device L1' (e.g., the network node NN) once entered the PFNS state.

Referring to FIG. 9A and identically to steps of FIG. 8A, at step S901, all luminaire devices L1-L200, L1'-L200' are turned on at once by means of the power switch 701 and all of them enter the FNS state. At step S902, the gateway GWI is individually turned on, while the gateway GWII remains turned off. At step S903, the gateway GWI connects to the mobile app via the mobile user terminal 702 and, at step S904, the mobile app triggers the gateway GWI to form its own network (e.g., the first network). To do so, the gateway GWI starts a luminaire device discovery during a predetermined time duration (e.g., 30 minutes) by sending to all luminaire devices L1-L200, L1'-L200' a respective enhanced permit-join request, as a dedicated message to join its own network (i.e., the first network), during a limited time duration (e.g., 1 minute) at step S904A, and then, a respective normal permit-join request, as a normal message to join its own network (i.e., the first network), during the remaining time duration (i.e., 29 minutes) at step S90413. Only the luminaire devices entered the PFNS state (i.e., the not-commissioned state) will be responsive to the enhanced permit-join request by changing their state from PFNS to FNS. However, at this stage, all luminaire devices L1-L200, L1'-L200' are assumed to be in the FNS state. In response to receiving the permit-join requests, the expected luminaire devices L1-L200 and the unexpected luminaire device L1' connect, at step S904C, to the gateway GWI in the zone ZI and enter the CS state from the FNS state. Then, the gateway GWI reports, at step S904D, the list of the connected luminaire devices L1-L200, L1' to the mobile user terminal 702.

Referring to FIG. 9B, the mobile user terminal 702 instructs, at step S905, the powered-on gateway GWI to identify the possible unexpected luminaire devices by making all connected luminaire devices L1-L200, L1' blink one by one. After finding the unexpected luminaire device L1', the mobile user terminal 702 instructs, at step S906, the powered-on gateway GWI to remove this unexpected luminaire device L1'. Once it has been removed upon receipt of a "Leave-Req" command, the unexpected luminaire device L1' changes its state from CS to PFNS. If needed, the steps S905 to S906 may be performed again to ensure that all unexpected luminaire devices are well identified. At step S907, the mobile user terminal 702 instructs the powered-on gateway GWI to close its own network previously formed by itself, thereby preventing any luminaire device and in particular the luminaire device L1' from joining the network formed by the gateway GWI. After closing its network, the gateway GWI informs, at step S908, the unexpected luminaire device L1' about this network closure. At step S909, the gateway GWI sends an enhanced permit-join request, as a dedicated message to join network. The network is an available open network, that is here specifically the network to be formed by the gateway GWII (i.e., the second network), to the unexpected luminaire device L1' during a limited time duration (e.g., 1 minute). In response to receiving the enhanced permit-join request, the luminaire device L1' entered the PFNS state (i.e., the not-commissioned state) reboots or reset to enter the FNS state. At step S910, the gateway GWII is turned on and connects, at step S911, to the mobile app via the mobile user terminal 702. At step S912, the mobile app triggers the gateway GWII to form its own network (e.g., the second network). To do so, the gateway GWII starts a luminaire device discovery during a predetermined time duration (e.g., 30 minutes) by sending, at step S912A, a respective normal permit-join request, as a normal message to join its own network (i.e., the second network), to the non-connected luminaire devices L1'-L200', knowing that only the luminaire devices that are in the FNS state will be responsive to the normal permit-join requests. Thus, in response to receiving those normal permit-join requests, the expected luminaire devices L1'-L200', which are all, at this stage, in the FNS state, connect, at step S912B, to the gateway GWII in the zone ZII and enter the CS state from the FNS state. Then, the gateway GWII reports, at step S912C, the list of the connected luminaire devices L1'-L200' to the mobile user terminal 702. Thus, the above complete procedure of FIGS. 9A and 9B has enabled the luminaire device L1', which was unexpectedly connected to a "wrong" network formed by the gateway GWI, to expectedly connect to a "right" network formed by the gateway GWII, while preventing it from connecting again to the gateway GWI.

Referring to the embodiments of FIGS. 8A, 8B, 9A and 9B, it should be noted that each enhanced permit-join request may, for example, have a time duration of three seconds, consist of three continuous normal permit-join requests having each a time duration of one second and be detected by a luminaire device by means of its timer.

To summarize, the present invention relates to commissioning in the presence of multiple networks. A network node NN, which is expected to join a second network, joins a first network and enters a second state (CS) from a first state (FNS) once it has joined the first network. Once it has received from the first network a message to leave it, it enters a third state (PFNS) from the second state (CS). The network node NN entered the third state (PFNS) then becomes responsive with respect to the first network and/or the second network by receiving a dedicated message to join network or is unresponsive with respect to the first network. Then, it enters the first state (FNS) from the third state (PFNS) once the network node NN has received the dedicated message from a coordinator (C1) of the first network after closing the first network and/or from a coordinator (C2) of the second network, or upon expiry of a timer which has started once the network node NN has received the message to leave the first network. Through a commissioning procedure of auto-join, the network node NN will then join the second network as expected by entering the second state (CS) from the first state (FNS). Thus, the provision of a specific state (PFNS) will allow a network node NN identified as having joined an unexpected network (first network) to join an expected network (second network) while avoiding to join again the unexpected network (first network).

While the invention has been illustrated and described in detail in the drawings and foregoing description, such illustration and description are to be considered illustrative or exemplary and not restrictive. The invention is not limited to the disclosed embodiments with lamps, luminaire or lighting devices. It can be implemented in connection with any type loads, sensors, switches and the like. The proposed joining procedures can be applied to and possibly standardized in other types of multi-hop networks and with other types of messages and command frames. Moreover, the invention can be applied in any product that implements a wireless network (of ZigBee or other type) interfacing with another wireless network.

Other variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage.

The foregoing description details certain embodiments of the invention. It will be appreciated, however, that no matter how detailed the foregoing appears in the text, the invention may be practiced in many ways, and is therefore not limited to the embodiments disclosed. It should be noted that the use of particular terminology when describing certain features or aspects of the invention should not be taken to imply that the terminology is being re-defined herein to be restricted to include any specific characteristics of the features or aspects of the invention with which that terminology is associated.

A single unit or device may fulfill the functions of several items recited in the claims. The mere fact that certain measures are recited in mutually different dependent claims does not indicate that a combination of these measures cannot be used to advantage.

The described operations of the components of the network system according to various embodiments, and in particular the procedures like those indicated in FIGS. 4, 5, 6 and 8, can be implemented as program code means of a computer program and/or as dedicated hardware. The computer program may be stored and/or distributed on a suitable medium, such as an optical storage medium or a solid-state medium, supplied together with or as part of other hardware, but may also be distributed in other forms, such as via the Internet or other wired or wireless telecommunication systems.

The invention claimed is:

1. A network node for joining a second network being a personal area network with a coordinator node, the network node comprising:
a processor adapted to:
  enter a second state from a first state once the network node has joined a first network, the first network being other than the second network and being a personal area network with a coordinator node;
  enter a third state from the second state once the network node has received a message from the first network to leave the first network, the third state being different from the first and the second states and the third state being a state in which the network node is unresponsive with respect to the first network other than receipt of a dedicated message to join the second network and does not send join requests; and
  enter the first state from the third state upon determining by the network node that a predetermined trigger condition is met.

2. The network node according to claim 1, the processor being further adapted to:
start a timer once the network node has left the first network, the timer having a predetermined time duration; and
the predetermined trigger condition comprising expiration of the timer, the network node being further adapted to enter the first state from the third state once the predetermined time duration of the timer has expired.

3. The network node according to claim 1, wherein the predetermined trigger condition comprises the network node receiving a message instructing the network node to enter the first state from the first network or the second network, and the network node processor is adapted to enter the first state from the third state once the network node has received the message instructing the network node to enter the first state from the first network or from the second network.

4. The network node according to claim 1, wherein the predetermined trigger condition is a reboot of the network node and the network node processor is further adapted to enter the first state from the third state upon a reboot of the network node.

5. The network node according to claim 3, wherein:
the message instructing the network node to enter the first state from the first network is received from a coordinator node of the first network or the message instructing the network node to enter the first state from the second network is received from a coordinator of the second network.

6. The network node according to claim 5, wherein:
the message instructing the network node to enter the first state is received from the coordinator node of the first network after closing the first network.

7. The network node according to claim 3, wherein: the third state is a state the network node avoids a start commission procedure of auto-join.

8. The network node according to claim 3, wherein:
the message instructing the network node to enter the first state is at least one of a new message or an enhanced existing message.

9. The network node according to claim 8, wherein:
the enhanced existing message is an enhanced permit-join request having a predetermined time duration and structure.

10. The network node according to claim 1, wherein:
the first state is a factory-new state (FNS), the second state is a commissioned state (CS) and the third state is a not-commissioned or pre-factory-new state (PFNS).

11. A lighting system comprising a plurality of network nodes as claimed in claim 1.

12. A method of joining a second network being a personal area network with a coordinator node for a network node, the method comprising:
entering a second state from a first state once the network node has joined a first network, the first network being other than the second network and being a personal area network with a coordinator node;
entering a third state from the second state once the network node has received a message from the first network to leave the first network, the third state being different from the first and the second states and the third state being a state in which the network node is unresponsive with respect to the first network other than receipt of a dedicated message to join the second network and does not send join requests; and
entering the first state from the third state upon determining by the network node a predetermined trigger condition is met.

13. The method of claim 12 further comprising:
- starting a timer once the network node has left the first network, the timer having a predetermined time duration and the predetermined trigger condition comprising expiration of the timer; and
- entering the first state from the third state once the predetermined time duration of the timer has expired.

14. The method of claim 12, wherein the predetermined trigger condition comprises the network node receiving a message instructing the network node to enter the first state from at least one of the first network or the second network and the method further comprises:
- entering the first state from the third state once the network node has received a message instructing the network node to enter the first state from the at least one of the first network or the second network.

15. A non-transitory computer program product for a computing device,
- the computer program product comprising program instructions or code means such that, when the computer program product is run on a processing unit of the computing device, the computing device is arranged to perform the method of claim 12.

\* \* \* \* \*